(12) United States Patent
Gao et al.

(10) Patent No.: US 11,537,623 B2
(45) Date of Patent: Dec. 27, 2022

(54) DEEP SEMANTIC CONTENT SELECTION

(71) Applicant: Meta Platforms, Inc., Menlo Park, CA (US)

(72) Inventors: Tianshi Gao, Fremont, CA (US); Ahmad Abdulmageed Mohammed Abdulkader, Palo Alto, CA (US); Yifei Huang, Belmont, CA (US); Ou Jin, Fremont, CA (US); Liang Xiong, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 965 days.

(21) Appl. No.: 15/599,240

(22) Filed: May 18, 2017

(65) Prior Publication Data

US 2018/0336490 A1 Nov. 22, 2018

(51) Int. Cl.
*G06F 16/2457* (2019.01)
*G06N 7/00* (2006.01)
*G06N 20/00* (2019.01)

(52) U.S. Cl.
CPC ....... *G06F 16/24578* (2019.01); *G06N 7/005* (2013.01); *G06N 20/00* (2019.01)

(58) Field of Classification Search
CPC ... G06N 20/00; G06N 7/005; G06F 16/24578
See application file for complete search history.

(56) References Cited

U.S. PATENT DOCUMENTS

| 7,113,917 | B2* | 9/2006 | Jacobi | G06Q 30/0253 |
| | | | | 705/14.53 |
| 8,166,029 | B2* | 4/2012 | Park | G06F 16/735 |
| | | | | 707/732 |
| 9,110,955 | B1* | 8/2015 | Bernhardsson | G06F 16/24578 |
| 10,115,146 | B1* | 10/2018 | Anderson | G06Q 30/02 |
| 2011/0029464 | A1* | 2/2011 | Zhang | G06N 5/045 |
| | | | | 706/12 |
| 2013/0073568 | A1* | 3/2013 | Federov | G06Q 30/0269 |
| | | | | 707/749 |
| 2015/0112801 | A1* | 4/2015 | Nice | G06Q 30/0269 |
| | | | | 705/14.53 |
| 2015/0278910 | A1* | 10/2015 | Nice | G06Q 30/0631 |
| | | | | 705/26.7 |

(Continued)

OTHER PUBLICATIONS

Factorization Meets the Item Embedding: Regularizing Matrix Factorization with Item Co-occurrence Liang et al. (Year: 2016).*

(Continued)

*Primary Examiner* — Eric Nilsson
*Assistant Examiner* — Ababacar Seck
(74) *Attorney, Agent, or Firm* — Fenwick & West LLP (57) ABSTRACT

To select the content to be presented to the user, a first latent vector is determined for a content item based on a first object associated with the content item. A second latent vector is determined for the content item based on a second object associated with the content item. A content item vector is then determined based on the first and second latent vectors. Furthermore, a user vector is determined based on interactions of the user with the first set of content objects and the second set of content objects. A score indicative of the likelihood of the user interacting with the content item is determined based on the content item vector and the user vector.

20 Claims, 4 Drawing Sheets

(56) References Cited

U.S. PATENT DOCUMENTS

| | | | |
|---|---|---|---|
| 2016/0012123 A1* | 1/2016 | Hu | G06F 16/36 |
| | | | 707/739 |
| 2016/0012512 A1* | 1/2016 | Haiby | H04W 4/02 |
| | | | 705/26.7 |
| 2016/0055159 A1* | 2/2016 | Connolly | G06F 16/24578 |
| | | | 707/734 |
| 2016/0140643 A1* | 5/2016 | Nice | G06F 16/3344 |
| | | | 705/26.7 |
| 2016/0188725 A1* | 6/2016 | Wang | G06F 16/9535 |
| | | | 707/734 |
| 2016/0203191 A1* | 7/2016 | Nice | G06F 16/955 |
| | | | 707/756 |
| 2017/0031920 A1* | 2/2017 | Manning | G06F 16/435 |
| 2018/0232661 A1* | 8/2018 | Li | G06K 9/6219 |
| 2018/0232700 A1* | 8/2018 | Li | G06N 5/04 |
| 2018/0285774 A1* | 10/2018 | Soni | G06F 16/9535 |
| 2018/0293485 A1* | 10/2018 | Merhav | G06N 20/00 |
| 2018/0329928 A1* | 11/2018 | Gupta | G06K 9/00711 |
| 2018/0342004 A1* | 11/2018 | Yom-Tov | G06N 7/08 |

OTHER PUBLICATIONS

Cross-domain recommendation without shared users or items by sharing latent vector distributions Iwata et al. (Year: 2015).*

Matrix factorization techniques for recommender systems. Koren et al. (Year: 2006).*

ExcUseMe: Asking Users to Help in Item Cold-Start Recommendations Aharon et al. (Year: 2015).*

Heterogeneous Network Embedding via Deep Architectures Chang et al. (Year: 2015).*

Recommendation by Mining Multiple User Behaviors with Group Sparsity Yuan et al. (Year: 2014).*

* cited by examiner

DEEP SEMANTIC CONTENT SELECTION

BACKGROUND

This disclosure relates generally to selecting content for being displayed to users of an online system, and more specifically to multilevel feature representation of users and content items for selecting content to be presented to the users of the online system.

Some online systems, such as a social networking system, provides content items to users based on models that attempt to score or rank the content available in the online system based on a likelihood that a user will be interested in the content item or based on a likelihood that the user will interact with the content. Those models are generated based on feedback signals. For instance, a user that has previously watched several videos related to soccer might be interested in a video that other soccer fans have previously watched. Such model may not be accurate when only a limited amount of feedback is available for a specific piece of content or for a specific user. That is, when a new content item is available for presentation to users, feedback for the content item to generate a model to predict the likelihood of a user being interested in the content item may not be available until a number of users have interacted with the content item.

SUMMARY

To select the content to be presented to the user, user interactions with different objects associated with a content item are separately modeled to generate a latent vector space representing user interactions with each type of object. The latent vector space may represent user co-engagement with various objects or by different categories of interactions. For a given content item, it may be represented by the latent vectors of each object (which may have different types), as well as a vector describing the content item itself. For example, a content item may include a link to an external page as well as a link to an internal page in a social networking system. The external page may be associated with a first latent vector representing the external page and the internal page may be represented by a second latent vector. The external page latent vector may be determined based on user interactions with a set of external pages. In this way, a page (or other content item) may be represented as the combination of latent vector spaces of the objects (here, an external page and internal page) related to the page (or other content item). This permit a page to be represented by other objects related to the page, such that training a model to predict the likelihood of interactions with the page may use the related object's latent space and more effectively predict interactions with the page without relying on existing user interactions with page to train the model as the model may be trained on other content items associated with objects represented in the same latent vector spaces.

In some embodiments, a first latent vector is determined for a content item based on a first object associated with the content item. The first latent vector is determined based on co-occurrence of interactions of a first set of users with a first set of content objects having the same object type as the first object. A second latent vector is determined for the content item based on a second object associated with the content item. The second latent vector is determined based on co-occurrence of interactions of a second set of users with a second set of content objects having the same object type as the second object. A content item vector is then determined based on the first and second latent vectors. Furthermore, a user vector is determined based on interactions of the user with the first set of content objects and the second set of content objects. A score indicative of the likelihood of the user interacting with the content item is determined based on the content item vector and the user vector.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
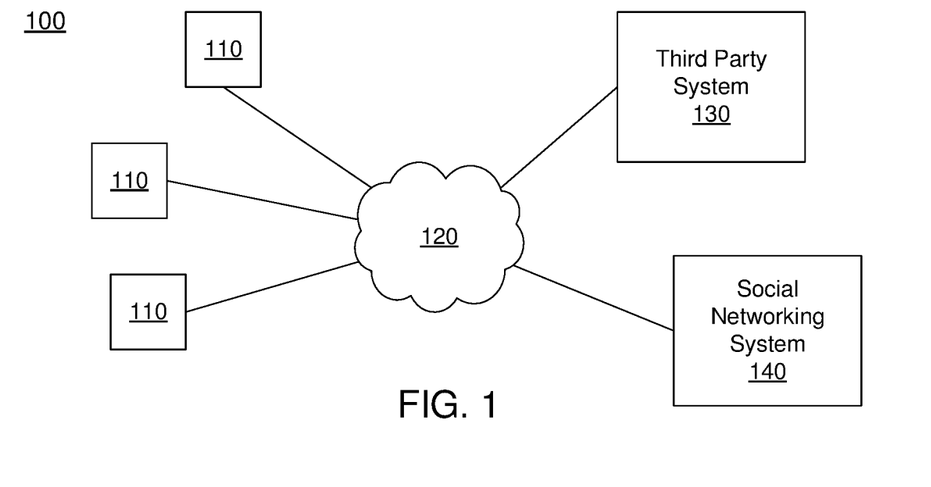
FIG. 1 is a block diagram of a system environment in which an online system operates, according to one embodiment.

FIG. 1 is a block diagram of a system environment 100 for an online system 140, according to one embodiment. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
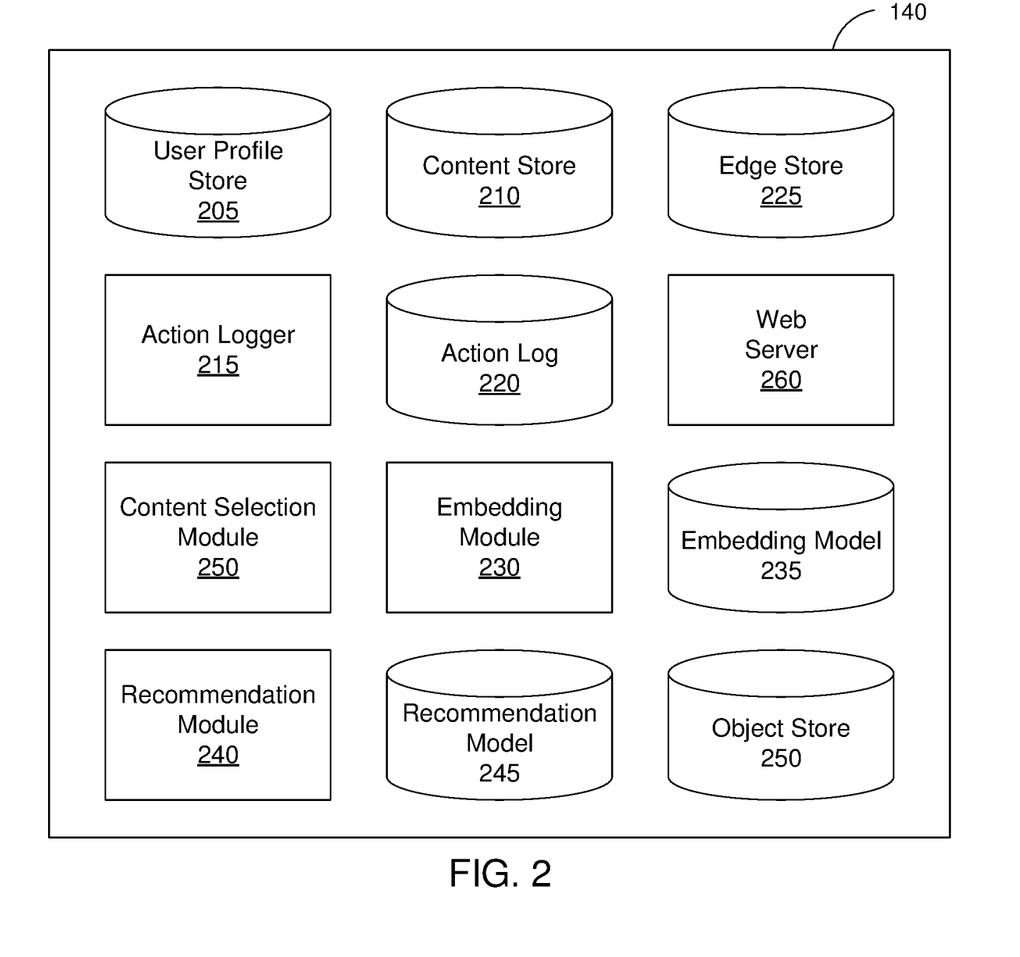
FIG. 2 is a block diagram of an architecture of an online system, according to one embodiment.

FIG. 2 is a block diagram of an architecture of the online system 140, according to one embodiment. The online system 140 shown in FIG. 2 includes a user profile store 205, a content store 210, an action logger 215, an action log 220, an edge store 225, an embedding module 230, an embedding representation 235, a recommendation module 240, a recommendation model 245, and a content selection module 250, and a web server 260. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

In some embodiments, content items are associated with one or more objects. For instance, objects content items may be associated with include a webpage (for a landing page), a mobile application, and a product. The social networking system 140 may include an object store 250 that stores information about the different objects. Furthermore, object store 250 may store information regarding the interaction of users of the social networking system 140 and the different objects.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The embedding module 230 applies machine learning techniques to generate an embedding representation 235 that includes embedding vectors (latent vectors) that describes the entities in latent space. As used herein, latent space is a vector space where each dimension or axis of the vector space is a latent or inferred characteristic of the objects in the space. Latent characteristics are characteristics that are not observed, but are rather inferred through a mathematical model from other variables that can be observed. In some embodiments, one or more latent characteristics are observable or measurable characteristics, but the embedding module 230 infers the value of the observable characteristic from other characteristics of the entity instead of directly measuring the observable characteristic.

The embedding representation 235 includes embedding vectors for users (user vectors). The embedding representation 235 is trained based on the co-occurrence of user interactions in the social networking system (e.g., co-occurrence of user interactions with pages in the social networking system, applications in the social networking system, or posts in the social networking system). The embedding representation 235 may be further trained based on user interactions in third-party systems. For example, the embedding module 230 may use a purchasing history of the user in a third-party online retailer to train the embedding representation 235. The embedding representation 235 may be further trained based on a webpage browsing history of the user. In some embodiments, the embedding representation 235 is trained so that users that have interacted with the same content items are located closer to each other in latent space. After the embedding representation 235 is trained for determining embedding vectors for users, an embedding vector for any user may be determined using information of the user available by the online system.

The embedding representation 235 includes embedding vectors for content items of the social networking system. The embedding representation 235 is trained based on different features of the content item. For instance, the embedding module 230 may use the words contained in the content item, an image or video contained in the content item, a landing page of the content item, a product associated with the content item, and a user associated with the content item to train the embedding representation 235. In some embodiments, the embedding representation 235 includes sub-vectors for each of the features of the content item, and the sub-vectors are concatenated to generate the embedding vector of the content item.

In some embodiments, the embedding representation 235 includes an engagement embedding representation 235A, a web embedding representation 235B, an app embedding representation 235C, and a word embedding representation 235D. The engagement embedding representation 235A is trained based on user/page organic co-engagements. The web embedding representation 235B is trained based on webpage organic visits made by users. The app embedding representation 235C is trained based on mobile app organic installs made by users. The word embedding representation 235 is trained based on available text documents (e.g., using Wikipedia's documents, or text included in content items). In some embodiments, some of the embedding representations 235 are trained using information stored by the social networking system 140 about objects stored in the object store. In other embodiments, some of the embedding representations 235 are trained using information stored in the action log 220.

Figure 3A:
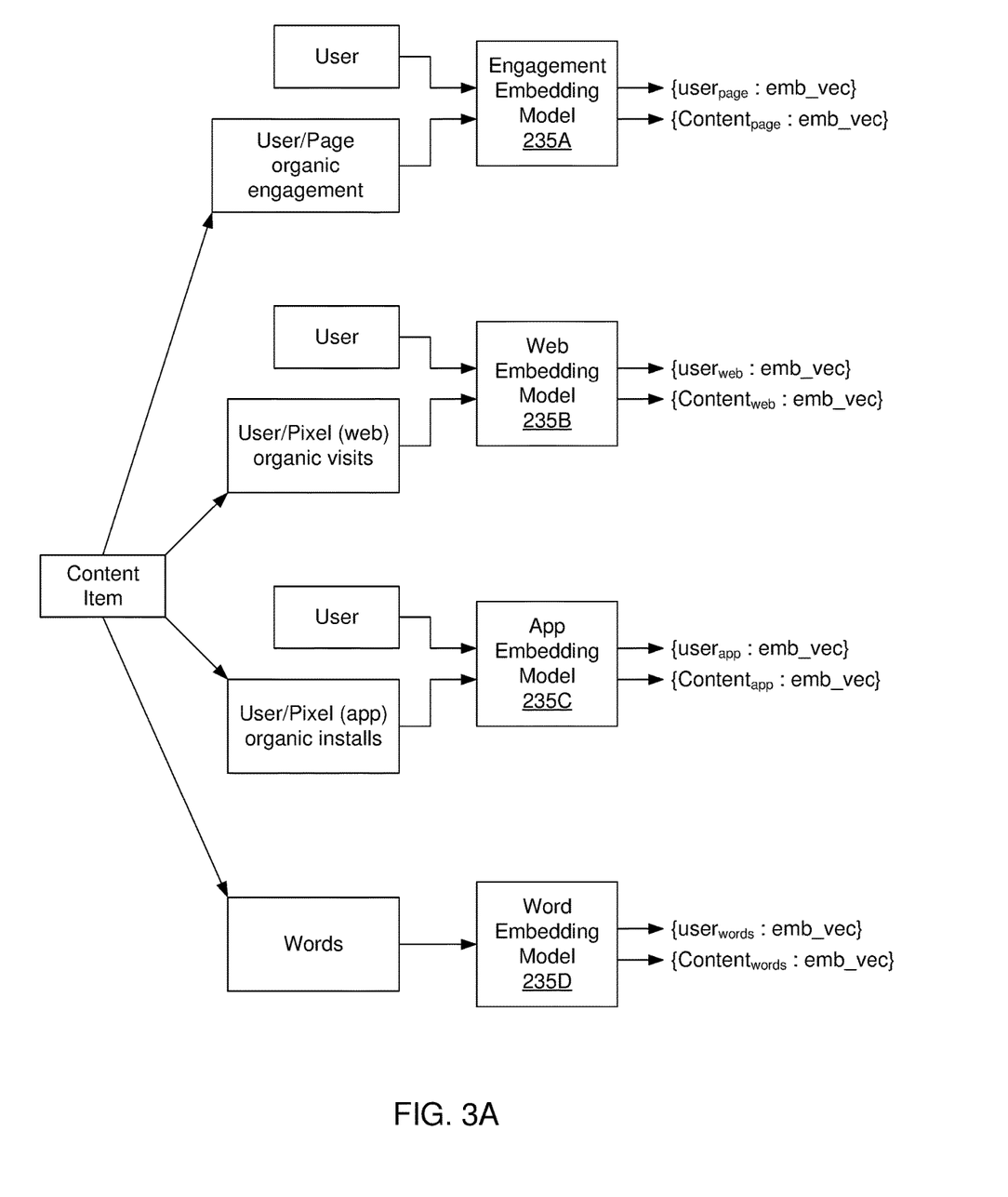
FIG. 3A is a diagram for determining embedding vectors for a user and a content item, according to one embodiment.

FIG. 3A illustrates a diagram for determining embedding vectors for a user and a content item, according to one embodiment. An embedding sub-vector $\{user_{page}:emb\_vec\}$ is identified from the engagement embedding representation 235A trained based on user/page organic engagement data, embedding sub-vector $\{userweb:emb\_vec\}$ is identified from the web embedding representation 235B trained based on User/Web organic visits data, embedding sub-vector $\{user_{app}:emb\_vec\}$ is identified from the app embedding representation 235C trained based on User/App organic installs data, and embedding sub-vector $\{user_{word}:emb\_vec\}$ is identified from the word embedding representation 235D trained based on words included in available text documents. Furthermore, embedding sub-vector $\{content_{page}:emb\_vec\}$ for the page associated with the content item, embedding sub-vector $\{content_{web}:emb\_vec\}$ for a landing page (webpage) associated with the content item, embedding sub-vector $\{content_{app}:emb\_vec\}$ for a mobile application associated with the content item, and embedding sub-vector $\{content_{word}:emb\_vec\}$ based on the words in the body of the content item are identified from corresponding embedding representations 235. The embedding module 230 then concatenates the sub-vectors $\{user_{page}:emb\_vec\}$, $\{user_{page}:emb\_vec\}$, $\{user_{app}:emb\_vec\}$, and $\{user_{word}:emb\_vec\}$ to obtain the embedding vector for the user, and concatenates the sub-vectors $\{content_{page}:emb\_vec\}$, $\{content_{page}:emb\_vec\}$, $\{content_{app}:emb\_vec\}$, and $\{content_{word}:emb\_vec\}$ to obtain the embedding vector for the content item.

In some embodiments, sub-vectors are only identified for the content items, and a single embedding vector is identified for the user. The embedding module 230 obtains the embedding vector for the user directly from the embedding representation 235, and obtains the embedding vector for the content item by concatenating the sub-vectors.

Referring back to FIG. 2, the recommendation module 240 determines a score indicative of a likelihood of a user interaction with the content item based on the embedding vector of the content item and a user vector of a user. As used herein, a user interaction with a content item occurs when a user takes a specific action with a content item presented to the user. The actions to be taken by the user may, for example, be clicking a link included in the content item impression, playing a video included in the content item, installing an app associated with the content item, or purchasing a product associated with the content item. Since the embedding vectors for users and the embedding vectors for the content items might be in different latent spaces, directly comparison between the embedding vectors might not be a reliable indication of the likelihood of users interacting with the content items. Instead, an embedding vector for a user and an embedding vector for a content item are used as inputs to a recommendation model 245. The recommendation model 245 then determines a score indicative of the likelihood of the user interacting with the content item. In some embodiments, the recommendation model 245 maps the embedding vectors of users and the embedding vectors of the content items to a new latent space, so that direct comparison is possible. In this embodiment, after both the embedding vector for a user and the embedding vector for the content item have been translated to the new latent space, a distance or angle between the embedding vectors may be calculated as the likelihood of the user interacting with the content item.

The recommendation module 240 trains a recommendation model 245 based on historical content item impressions to users of the social networking system. That is, historical user interactions with content items are used as positive training samples to train the recommendation model 245. The recommendation module 240 may further use historical content item impressions that did not result in a user interaction as negative training samples to train the recommendation model 245.

Figure 3B:
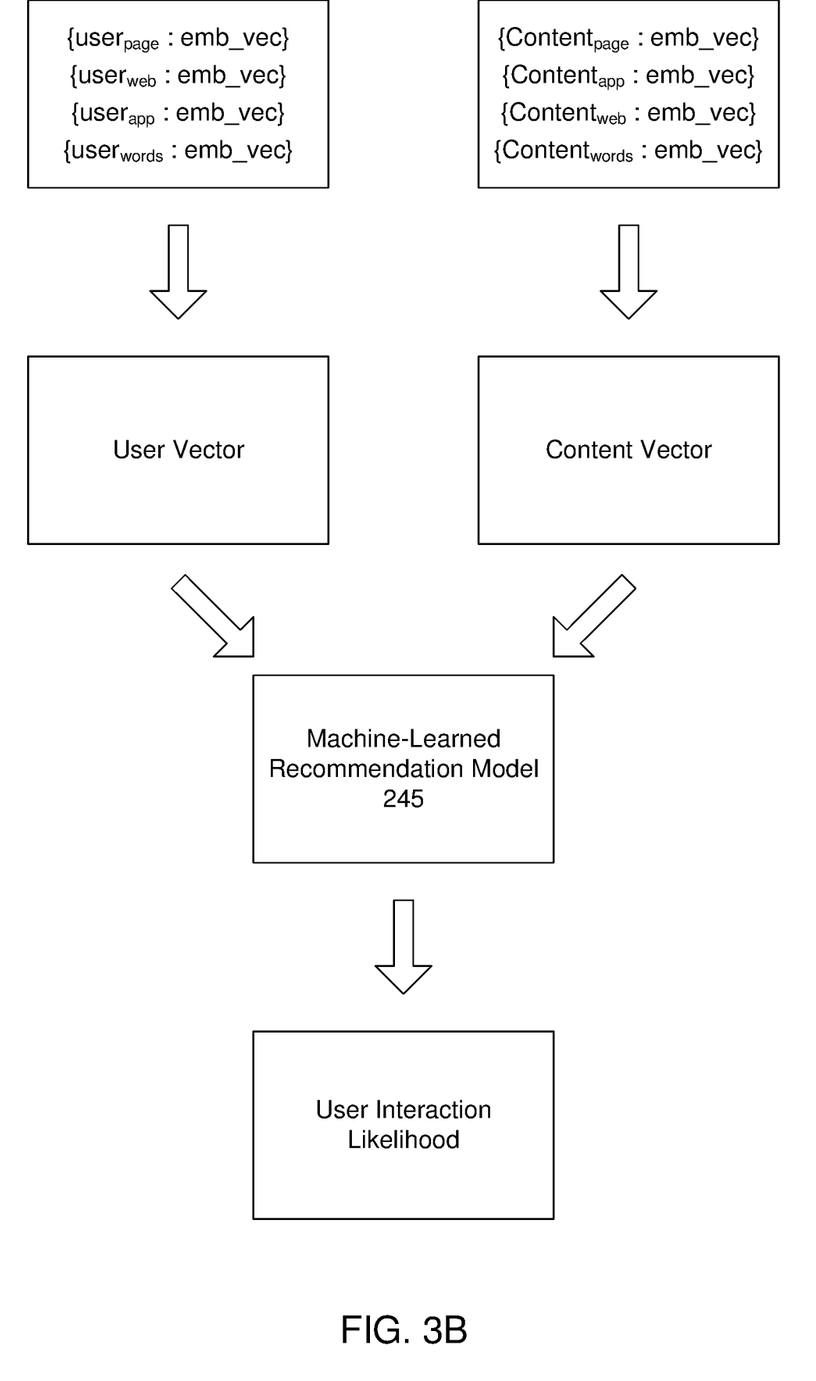
FIG. 3B illustrates a diagram for determining a score indicative of the likelihood of a user interacting with a content item, according to one embodiment.

FIG. 3B illustrates a diagram for determining a score indicative of the likelihood of a user interacting with a content item, according to one embodiment. A user vector and a content vector are identified using the embedding representation 235. In the example of FIG. 3B, the user vector is generated by concatenating user sub-vectors {$user_{page}$:emb_vec}, {$user_{page}$: emb_vec}, {$user_{app}$:emb_vec}, and {$user_{word}$:emb_vec} from the embedding representation 235, and the content vector is generated by concatenating content sub-vectors {$content_{page}$: emb_vec}, {$content_{page}$:emb_vec}, {$content_{app}$:emb_vec}, and {$content_{word}$:emb_vec} from the embedding representation 235. The user vector and the content vector are then provided to the recommendation model 245. The recommendation model 245 determines a score indicative of the likelihood of the user interacting with the content item based on the user vector and the content vector.

Referring back to FIG. 2, the content selection module 250 selects one or more content items for communication to a client device 110 to be presented to a user. Content items eligible for presentation to the user are retrieved from the content store 210 or from another source by the content selection module 250, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 250 includes content items eligible for presentation to the user in one or more selection processes, which identify a set of content items for presentation to the user. For example, the content selection module 250 determines measures of relevance of various content items to the user based on characteristics associated with the user by the online system 140 and based on the user's affinity for different content items. Based on the measures of relevance, the content selection module 250 selects content items for presentation to the user. As an additional example, the content selection module 250 selects content items having the highest measures of relevance or having at least a threshold measure of relevance for presentation to the user. Alternatively, the content selection module 250 ranks content items based on their associated measures of relevance and selects content items having the highest positions in the ranking or having at least a threshold position in the ranking for presentation to the user.

Content items eligible for presentation to the user may include content items associated with bid amounts. The content selection module 250 uses the bid amounts associated with ad requests when selecting content for presentation to the user. In various embodiments, the content selection module 250 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the bid amount and a likelihood of the user interacting with the content item as determined by the recommendation module 240. The content selection module 250 may rank content items based on their associated bid amounts and select content items having at least a threshold position in the ranking for presentation to the user. In some embodiments, the content selection module 250 ranks both content items not associated with bid amounts and content items associated with bid amounts in a unified ranking based on bid amounts and measures of relevance associated with content items. Based on the unified ranking, the content selection module 250 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 250 receives a request to present a feed of content to a user of the online system 140. The feed may include one or more content items associated with bid amounts and other content items, such as stories describing actions associated with other online system users connected to the user, which are not associated with bid amounts. The content selection module 250 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 250 to identify candidate content items eligible for presentation to the user. For example, content items associated with users who are not connected to the user or stories associated with users for whom the user has less than a threshold affinity are discarded as candidate content items. Based on various criteria, the content selection module 250 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 250 presents content to a user through a newsfeed including a plurality of content items selected for presentation to the user. One or more content items may also be included in the feed. The content selection module 250 may also determine the order in which selected content items are presented via the feed. For example, the content selection module 230 orders content items in the feed based on likelihoods of the user interacting with various content items as determined by the recommendation module 240.

The web server 260 links the online system 140 via the network 120 to the one or more client devices 110, as well as to the one or more third party systems 130. The web server 260 serves web pages, as well as other content, such as JAVA®, FLASH®, XML and so forth. The web server 260 may receive and route messages between the online system 140 and the client device 110, for example, instant messages, queued messages (e.g., email), text messages, short message service (SMS) messages, or messages sent using any other suitable messaging technique. A user may send a request to the web server 260 to upload information (e.g., images or videos) that are stored in the content store 210. Additionally, the web server 260 may provide application programming interface (API) functionality to send data directly to native client device operating systems, such as IOS®, ANDROID™, or BlackberryOS.

Multi-Level Feature Representation for Content Item Selection

Figure 4:
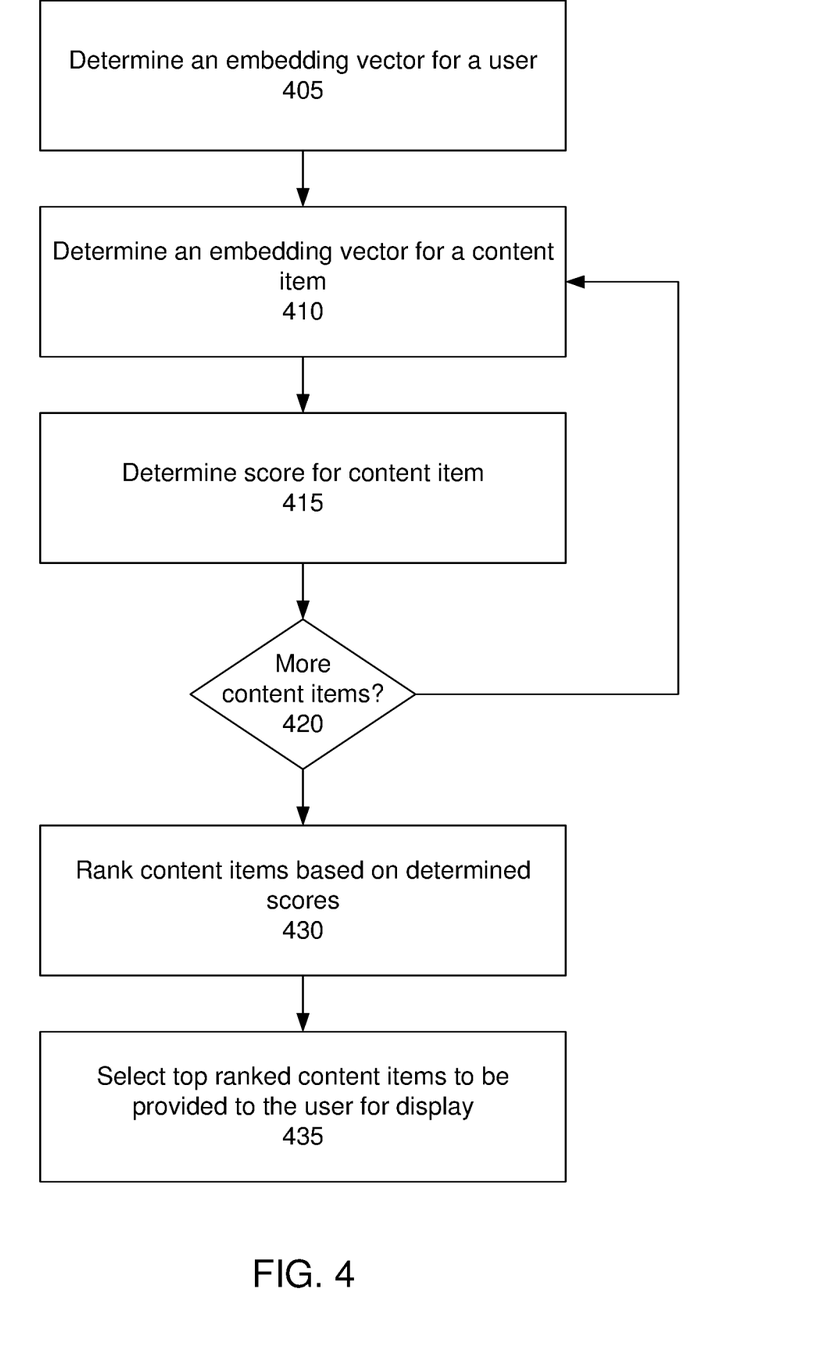
FIG. 4 is a flow diagram of a method for selecting content items to be displayed to a user of the social networking system, according to one embodiment.

FIG. 4 is a flow diagram of a method for selecting content items to be displayed to a user of the social networking system, according to one embodiment. The embedding module 230 determines 405 an embedding vector for a user of the social networking user. The embedding module 230 further determines 410 an embedding vector for a content item that is eligible to be presented to the user. The recommendation module 240 determines 415 a score indicative of the likelihood of the user interacting with the content item based on the determined user embedding vector and content item embedding vector. In some embodiments, to determine the score, the recommendation module maps the embedding vector for the user and the embedding vector for the content item to a common latent space, and determines a measure of similarity between the mapped embedding vectors.

If there are other content items identified by the content selection module 250, embedding vectors are determined for each of the identified content items and a score indicative of the likelihood of the user interacting with each of the identified content items is determined. After all the content items identified by the content selection module 250 are analyzed, the content selection module 250 ranks 430 the identified content items based on the determined scores and selects 435 the top ranked content items to be provided to the user for display.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
  determining a first user latent vector for a user and a first object latent vector for a content item based on a first object associated with the content item, the first object having a first object type, wherein the first user latent vector and the first object latent vector are in a first latent space and determined using a first model trained based on co-occurrence of interactions of a first set of users with a first set of content objects having the first object type;
  determining a second user latent vector for the user and a second object latent vector for the content item based on a second object associated with the content item, the second object having a second object type, wherein the second user latent vector and the second object latent vector are in a second latent space and determined using a second model trained based on co-occurrence of interactions of a second set of users with a second set of content objects having the second object type, the second model different than the first model;

determining a third user latent vector for the user and a third object latent vector for the content item based on a third object associated with the content item, the third object having a third object type, wherein the third user latent vector and the third object latent vector are in a third latent space and determined using a third model trained based on co-occurrence of interactions of a third set of users with a third set of content objects having the third object type, the third model different than the first model and the second model;

determining a content item latent vector based on the first object latent vector, the second object latent vector, and the third object latent vector;

determining a user latent vector based on the first user latent vector, the second user latent vector, and the third user latent vector; and determining, using a machine-learned model trained based on past interactions of a plurality of users and a plurality of content items, a score indicative of a likelihood of the user interacting with the content item, the score based on the content item latent vector and the user latent vector.

2. The method of claim 1, wherein determining the score indicative of the likelihood of the user interacting with the content item comprises:

mapping the user latent vector to a fourth latent space using the machine-learned model;

mapping the content item latent vector for the content item to the fourth latent space using the machine-learned model; and determining a measure of similarity between the mapped user latent vector in the fourth latent space and the mapped content item latent vector for the content item in the fourth latent space.

3. The method of claim 2, wherein the fourth latent space is a combination of the first latent space, the second latent space, and the third latent space.

4. The method of claim 1, further comprising:

determining scores for a plurality of content items, each score indicative of a likelihood of the user interacting with a respective content item of the plurality of content items; and ranking the plurality of content items based on the determined scores of the plurality of content items.

5. The method of claim 1, further comprising:

identifying a plurality of content items that are eligible to be presented to the user based on characteristics of the user.

6. The method of claim 1, wherein the machine-learned model for determining the score indicative of the likelihood of the user interacting with the content item is trained based on the user's past interactions with content items.

7. The method of claim 1, wherein the first object associated with the content item is one of a product associated with the content item, a domain associated with the content item, an account associated with the content item, an image or video associated with the content item, an application associated with the content item, a page associated with the content item, and words associated with the content item.

8. The method of claim 7, wherein the second object associated with the content item is one of the product associated with the content item, the domain associated with the content item, the account associated with the content item, the image or video associated with the content item, the application associated with the content item, the page associated with the content item, and the words associated with the content item different from the first object.

9. The method of claim 1, wherein the user latent vector is determined based on the user's engagement in a social networking system.

10. The method of claim 1, wherein the user latent vector is determined based on the user's activity in one or more third party systems.

11. The method of claim 1, wherein determining the content item latent vector comprises concatenating the first object latent vector and the second object latent vector, and wherein determining the user latent vector comprises concatenating the first user latent vector and the second user latent vector.

12. The method of claim 1, further comprising:

receiving a request for a feed of content items to be presented to the user; and selecting the content item for presentation in the feed based on the determined score indicative of the likelihood of the user interacting with the content item; and causing a client device associated with the user to present the feed to the user.

13. A non-transitory computer readable storage medium storing instructions, the instructions when executed by a processor cause the processor to:

determine a first user latent vector for a user and a first object latent vector for a content item based on a first object associated with the content item, the first object having a first object type, wherein the first user latent vector and the first object latent vector are in a first latent space and determined using a first model trained based on co-occurrence of interactions of a first set of users with a first set of content objects having the first object type;

determine a second user latent vector and a second object latent vector for the content item based on a second object associated with the content item, the second object having a second object type, wherein the second user latent vector and the second object latent vector are in a second latent space and determined using a second model trained based on co-occurrence of interactions of a second set of users with a second set of content objects having the second object type, the second model different than the first model;

determine a third user latent vector for the user and a third object latent vector for the content item based on a third object associated with the content item, the third object having a third object type, wherein the third user latent vector and the third object latent vector are in a third latent space and determined using a third model trained based on co-occurrence of interactions of a third set of users with a third set of content objects having the third object type, the third model different than the first model and the second model;

determine a content item latent vector based on the first object latent vector, the second object latent vector, and the third object latent vector;

determine a user latent vector based on the first user latent vector, the second user latent vector, and the third user latent vector; and determine, using a machine-learned model trained based on past interactions of a plurality of users and a plurality of content items, a score indicative of a likelihood of the user interacting with the content item, the score based on the content item latent vector and the user latent vector.

14. The non-transitory computer readable storage medium of claim 13, wherein determining the score indicative of the likelihood of the user interacting with the content item comprises:
   mapping the user latent vector to a fourth latent space using the machine-learned model;
   mapping the content item latent vector for the content item to the fourth latent space using the machine-learned model; and
   determining a measure of similarity between the mapped user latent vector in the fourth latent space and the mapped content item latent vector for the content item in the fourth latent space.

15. The non-transitory computer readable storage medium of claim 13, wherein the instructions further cause the processor to:
   determine scores for a plurality of content items, each score indicative of a likelihood of the user interacting with a respective content item of the plurality of content items; and
   rank the plurality of content items based on the determined scores of the plurality of content items.

16. The non-transitory computer readable storage medium of claim 13, wherein the machine-learned model for determining the score indicative of the likelihood of the user interacting with the content item is trained based on the user's past interactions with content items.

17. The non-transitory computer readable storage medium of claim 13, wherein the first object is one of a product associated with the content item, a domain associated with the content item, an account associated with the content item, an image or video associated with the content item, an application associated with the content item, a page associated with the content item, and words associated with the content item.

18. The non-transitory computer readable storage medium of claim 13, wherein the user latent vector is determined based on at least one of: (1) the user's engagement in a social networking system and (2) the user's activity in one or more third party systems.

19. The non-transitory computer readable storage medium of claim 13, wherein determining the content item latent vector comprises concatenating the first object latent vector and the second object latent vector, and wherein determining the user latent vector comprises concatenating the first user latent vector and the second user latent vector.

20. A system comprising:
one or more processors; and
a non-transitory computer readable storage medium storing instructions, the instructions when executed by a processor cause the processor to:
   determine a first user latent vector for a user and a first object latent vector for a content item based on a first object associated with the content item, the first object having a first object type, wherein the first user latent vector and the first object latent vector are in a first latent space and determined using a first model trained based on co-occurrence of interactions of a first set of users with a first set of content objects having the first object type;
   determine a second user latent vector and a second object latent vector for the content item based on a second object associated with the content item, the second object having a second object type, wherein the second user latent vector and the second object latent vector are in a second latent space and determined using a second model trained based on co-occurrence of interactions of a second set of users with a second set of content objects having the second object type, the second model different than the first model;
   determine a third user latent vector for the user and a third object latent vector for the content item based on a third object associated with the content item, the third object having a third object type, wherein the third user latent vector and the third object latent vector are in a third latent space and determined using a third model trained based on co-occurrence of interactions of a third set of users with a third set of content objects having the third object type, the third model different than the first model and the second model;
   determine a content item latent vector based on the first object latent vector, the second object latent vector, and the third object latent vector;
   determine a user latent vector based on the first user latent vector, the second user latent vector, and the third user latent vector; and
   determine, using a machine-learned model trained based on past interactions of a plurality of users and a plurality of content items, a score indicative of a likelihood of the user interacting with the content item, the score based on the content item latent vector and the user latent vector.

* * * * *